(12) United States Patent
Reutelingsperger

(10) Patent No.: US 10,808,354 B2
(45) Date of Patent: *Oct. 20, 2020

(54) METHOD TO MANUFACTURE A TEXTILE PRODUCT, A USE THEREOF AND A DEVICE FOR APPLYING THE METHOD

(71) Applicant: DSM IP Assets B.V., Heerlen (NL)

(72) Inventor: Chris Reutelingsperger, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/770,544

(22) PCT Filed: Nov. 4, 2016

(86) PCT No.: PCT/EP2016/076676
§ 371 (c)(1),
(2) Date: Apr. 24, 2018

(87) PCT Pub. No.: WO2017/077036
PCT Pub. Date: May 11, 2017

(65) Prior Publication Data
US 2018/0313032 A1   Nov. 1, 2018

(30) Foreign Application Priority Data
Nov. 5, 2015   (EP) .................................... 15193218

(51) Int. Cl.
*D06N 7/00* (2006.01)
*B32B 5/02* (2006.01)
(Continued)

(52) U.S. Cl.
CPC ........... *D06N 7/0065* (2013.01); *B32B 5/022* (2013.01); *B32B 5/26* (2013.01); *B32B 7/12* (2013.01);
(Continued)

(58) Field of Classification Search
CPC .. B32B 5/022; B32B 5/26; B32B 7/12; B32B 37/1027; B32B 37/203; B32B 38/0012;
(Continued)

(56) References Cited

U.S. PATENT DOCUMENTS 4,189,335 A * 2/1980 Evans ................ G01B 11/0616
156/64
2011/0013176 A1   1/2011 Schwarz et al.

FOREIGN PATENT DOCUMENTS

| EP | 1 598 476 | 11/2005 |
| WO | 2012/076348 | 6/2012 |
| WO | 2014/198731 | 12/2014 |

OTHER PUBLICATIONS

International Search Report for PCT/EP2016/076676, dated Jan. 23, 2017, 4 pages.
(Continued)

*Primary Examiner* — George R Koch
(74) *Attorney, Agent, or Firm* — Nixon & Vanderhye P.C.

(57) ABSTRACT

The invention pertains to a method to manufacture a textile product comprising a first sheet having polymer yarns fastened to this sheet to form a pile thereon, the method comprising providing the sheet, stitching the polymer yarns through the sheet to form the pile on a first surface of the sheet and loops of the yarns at a second surface of the sheet, heating the second surface of the sheet to at least partly melt the loops of the yarns to fasten the yarns to the sheet, wherein the method comprises measuring a roughness of the second surface with the at least partly molten loops of the yarns thereon, after the at least partly molten loops have solidified and, if the roughness differs from a predetermined surface roughness, adapting the method to manufacture the textile product, in order to obtain a second surface roughness
(Continued)

Figure 1:
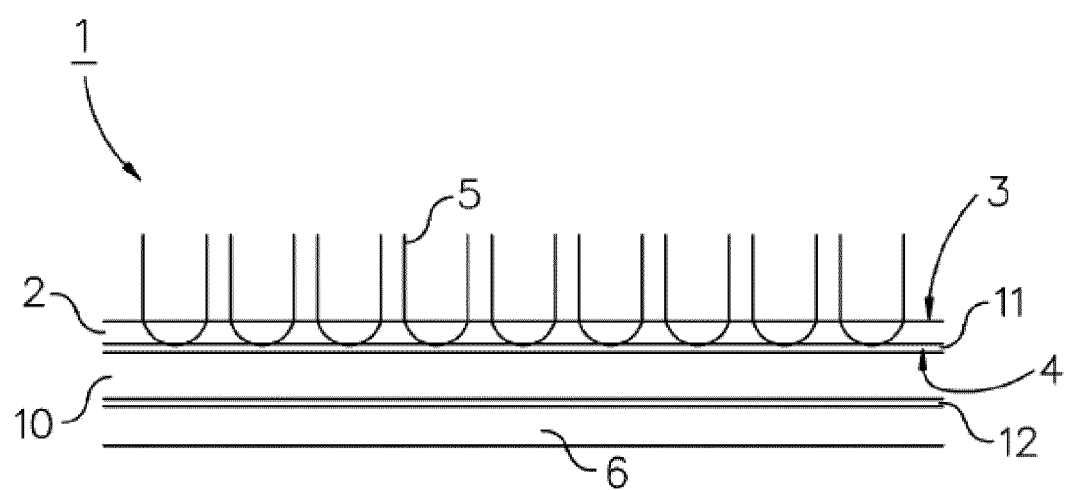

that differs from the measured surface roughness. The invention also pertains to a device for applying this method.

11 Claims, 3 Drawing Sheets

(51) Int. Cl.
    *B32B 5/26*     (2006.01)
    *B32B 7/12*     (2006.01)
    *B32B 37/12*     (2006.01)
    *B32B 37/20*     (2006.01)
    *B32B 38/00*     (2006.01)
    *D05C 15/04*     (2006.01)
    *D06H 3/08*     (2006.01)

(52) U.S. Cl.
    CPC ........ *B32B 37/1207* (2013.01); *B32B 37/203* (2013.01); *B32B 38/0012* (2013.01); *D05C 15/04* (2013.01); *D06H 3/08* (2013.01); *D06N 7/0071* (2013.01); *D06N 7/0078* (2013.01); *D06N 7/0081* (2013.01); *B32B 2037/1215* (2013.01); *B32B 2250/20* (2013.01); *B32B 2255/02* (2013.01); *B32B 2255/26* (2013.01); *B32B 2262/0276* (2013.01); *B32B 2305/20* (2013.01); *B32B 2367/00* (2013.01); *B32B 2471/02* (2013.01); *D06N 2201/02* (2013.01); *D06N 2203/061* (2013.01); *D06N 2205/06* (2013.01); *D06N 2211/06* (2013.01); *D10B 2503/04* (2013.01)

(58) Field of Classification Search
    CPC .... B32B 2471/02; D06N 3/08; D06N 7/0071; D06N 7/0078; D06N 7/0081; D06H 3/08; D06H 2201/10; D06H 2201/00
    See application file for complete search history.

(56) References Cited

OTHER PUBLICATIONS

Written Opinion of the ISA for PCT/EP2016/076676, dated Jan. 23, 2017, 7 pages.

\* cited by examiner

METHOD TO MANUFACTURE A TEXTILE PRODUCT, A USE THEREOF AND A DEVICE FOR APPLYING THE METHOD

This application is the U.S. national phase of International Application No. PCT/EP2016/076676 filed Nov. 4, 2016, which designated the U.S. and claims priority to EP Patent Application No. 15193218.3 filed Nov. 5, 2015, the entire contents of each of which are hereby incorporated by reference.

GENERAL FIELD OF THE INVENTION

The present invention pertains to a method to manufacture a textile product comprising a first sheet having polymer yarns fastened to this sheet to form a pile thereon, the method comprising providing the sheet, stitching the polymer yarns through the sheet to form the pile on a first surface of the sheet and loops of the yarns at a second surface of the sheet (the second surface being opposite to the first surface), and heating the second surface of the sheet to at least partly melt the loops of the yarns to fasten the yarns to the sheet. The invention also pertains to a method to use a textile product obtained with the new method and a device for applying the said method.

BACKGROUND ART

EP1598476 (Klieverik Heli) describes a method for manufacturing a textile product as indicated supra. In particular, the first sheet serves as a primary backing, which after the yarns have been fastened thereto, can act as an intermediate for making a carpet or other textile product, in which method the backing does not use a latex to anchor the yarns in place. The backing comprises a sheet with piles of thermoplastic yarns (also called fibres) stitched through the thickness of the sheet and protruding from its upper surface. At the lower surface the yarns extend from the second surface and form loops (either as a result from the stitching process itself or simply due to gravity) to provide for an intermediate anchoring of the yarns to the sheet (the yarns can still be removed easily by applying only a light pulling force by hand). The backing is then fed (yarn upwards) along a heated roller surface and its underside is pressed against the roller so the yarns will melt. Klieverik states that after cooling the yarns are firmly anchored to each other and the backing without the need for a latex polymer. One embodiment teaches that a thermoplastic adhesive (such as hot melt adhesive) may be applied additionally as a powder to the underside of the backing so the heated surface melts the yarns and adhesive together to create a good adhesion between the piles, the adhesive and the backing. In another embodiment pressure may be applied after heating (e.g. by a pressure roller) to the backing and piles in a direction perpendicular to the backing surface (i.e. from below) to smear the plasticised yarns together to enhance their mutual adhesion, thus allowing the heated roller to be held at a lower temperature, below that at which the yarns would fuse by heat alone. This method provides the advantage that the intermediate backing can be easily recycled since the yarns and backing sheet can be made from the same polymer. There is no incompatible latex penetrated into the fibre piles. There is also saving in energy and raw material costs compared to prior art methods.

WO 2012/076348 (Niaga) describes a method for manufacturing textile products that even improves the anchor strength of the yarn. In this method when the first yarn bearing sheet is pressed against the heated surface, the relative speed of the sheet and surface are adjusted to provide an additional mechanical force between them in the machine direction (i.e. the direction of transport of the sheet) which spreads the material of the yarn whilst it is still molten resulting in a stronger bond between the first sheet and the yarn. Though in theory in many cases an additional secondary support layer may no longer be necessary, this document does teach that such a support layer may still be useful, especially if it comprises a reactive adhesive relying on thermally reversible reactions between reactive molecules present at the interface between the textile product and the carrier material.

A research disclosure (RD591084) was also published anonymously on 25 Jun. 2013 describing certain methods for manufacturing carpets using a method as described here above in combination with polyester hot melt glues.

In many cases, a textile product as known from the art described here above will be glued to either a second sheet (as secondary backing, for example when manufacturing carpet tiles), or glued to a surface to be covered, such as a floor, the interior of a car, the interior of a boat or plane etc.

OBJECT OF THE INVENTION

It is an object of the invention to provide an improved method to manufacture a textile product.

SUMMARY OF THE INVENTION

In order to meet the object of the invention a method to manufacture a textile product as defined in the GENERAL FIELD OF THE INVENTION section has been devised, wherein the method comprises measuring a roughness of the second surface with the at least partly molten loops of the yarns thereon, after the at least partly molten loops have solidified (i.e. obtained a temperature below the melting temperature of the polymer) and, if the roughness differs from a predetermined surface roughness, adapting the method to manufacture the textile product, in order to obtain a second surface roughness that differs from the measured surface roughness.

Although of prime importance, applicant recognised that the primary strength of the yarn binding (i.e. the strength of binding the yarns to the first sheet due to the at least partly melting of the yarns at the second surface of this sheet) is not the only determining factor for durability of the textile product. In particular when the product in use is being adhered to a second sheet or other surface, the surface texture of the second surface after the melting of the loops appears to be of significant influence too. In particular the durability of the adherence to a second sheet or other surface, which durability on its turn has a significant influence on the wear of the textile product, seems to be dependent on the resulting surface texture of the second surface of the first sheet. In the art, this has most probably not been recognised as an important factor since one usually strives for a repeated result in manufacturing. If this leads to the same surface texture for every production run, the influence of the surface texture will not necessarily be recognised. Applicant however recognised that during continuous manufacturing over the years it will hardly be possible to keep all variables that may influence the surface texture due to melting of the polymer yarns exactly constant. Environmental circumstances may change, used materials may change (even batch by batch), process apparatuses may change without being noticed etc. Also, applicant recognised that for each and every application of the textile product a different surface texture may be optimal. The presently known methods cannot take all this into account.

With the method according to the current invention however all of the above can be taken adequately into account. By measuring the surface roughness (which encompasses measuring a surface roughness indicator or parameter), and comparing this roughness with a predetermined adequate roughness, for example, by checking whether the roughness is within a predetermined range, the process to manufacture the textile product can be adapted by varying any parameter that has an influence on the surface texture, to obtain a product having a different surface roughness, meeting the required properties, in particular, meeting properties required for a durable adherence of the textile product to a second sheet or other surface. Preferably the said different surface roughness meets a predetermined surface roughness or a predetermined range of surface roughness, optionally after a second or further adaptation.

The invention also pertains to the use of a textile product obtainable in line with the above described method to cover a surface of a building or any other artificial or natural construction.

The invention also pertains to a device for use in manufacturing a textile product comprising a first sheet having polymer yarns fastened to this sheet to form a pile thereon, the yarns being stitched through the sheet to form the pile on a first surface of the sheet and loops of the yarns at a second surface of the sheet, the device comprising a heating element that is able to heat the loops of the yarns to above a melting temperature of the polymer, and transport means for transporting the sheet with the stitched yarns along the heating element, wherein the second surface is directed to the heating element, wherein the device comprises a sensor to measure the surface roughness of the second surface, the sensor being positioned at a section distal of the heating element (that is after the loops of the yarns have been heated).

Definitions

A textile product is a product that comprises textile (i.e. material made mainly of natural or artificial fibres, often referred to as thread or yarn), optionally in combination with other components such as backing layers, carrier layers and/or adhesives. Textile products typically comprise an upper layer of pile attached to a backing (where the raised pile fibres are also denoted as the "nap" of the product), but may also be flat weave. Such products can be of various different constructions such as woven, needle felt, knotted, tufted and/or embroidered, though tufted products are the most common type. The pile may be cut (as in a plush carpet) or form loops (as in a Berber carpet).

A polymer yarn is a yarn in which the yarn forming substance is a natural or synthetic thermoplastic polymer. The most widely used polymer yarns for textile products are polyamide and polyester yarns. Polyamide is mostly either PA6 or PA6,6 and the polyester used is mostly polyethylene terephtalate, generally referred to simply as PET. Typically, the polymers used for yarns have a melting point (Tm) of about 220 to 280° C. and a glass transition temperature (Tg) of about 150 to about 180° C.

A loop of a yarn is a length of this yarn that may be curved away from the basic part of the yarn (not excluding that the loop is longer than the main part itself). For a textile product, the basic part of the yarn is the part that forms the upper, visible part of the product. For example, for a carpet this is the part of the yarns that forms the pile. For clothing, this is the part of the yarn that forms part of the outer surface of the clothing. The loop is the part that extends from the back surface of the product.

The glass transition temperature is the temperature at which an amorphous solid becomes soft upon heating or brittle upon cooling. The Tg is the temperature region where the polymer (when heated) transitions from a hard, glassy material to a soft, rubbery material. The glass transition temperature is always lower than the melting temperature (Tm) of the crystalline state of the material. The Tg can be established by using Differential Scanning calorimetry (DSC) at speed of 20K/min as commonly known in the art, typically by defining the midpoint of the said temperature region as Tg.

A sheet is a substantially two dimensional mass or material, i.e. broad and thin, typically, but not necessarily, rectangular in form, and inherently has two opposite surfaces.

Stitching is a method of mechanically making a yarn part of an object by stitches or as if with stitches, such as by tufting, knitting, sewing, weaving etc.

A process step taking place in-line means that this process step constitutes an integral part of a continuous sequence of operations.

Calendering is a process of smoothing a surface using pressure and/or heat.

A laminate is a structure comprising multiple stacked layers mechanically connected to each other.

A hot melt adhesive is a thermoplastic adhesive that is designed to be melted, i.e. heated to transform from a solid state into a liquid state to adhere materials after solidification. Hot melt adhesives are typically non-reactive, crystalline and comprise low or no amount of solvents so curing and drying are typically not necessary in order to provide adequate adhesion.

A central processing unit is a hardware system, programmed to process data. The hardware does not need to be one single unit, but may comprise several distributed units operatively connected via for example wireless connections.

EMBODIMENTS OF THE INVENTION

In a first embodiment of the invention the measuring of the roughness of the second surface, and the adaptation of the method to manufacture the textile product take place in-line. Typically, measurement of the surface roughness takes place off-line. The main reason for this is that, as is well known, vibrations of the environment might influence the roughness measurement. Therefore, surface roughness measurements are typically not performed in an industrial manufacturing line, inherently being under the influence of all kinds of vibrations, but off-line in a controlled vibration free environment. To applicant's surprise however, in-line measurement of the surface roughness appears to be adequate for improving the known textile product manufacturing methods, apparently since the types of vibrations corresponding to textile producing equipment (mainly large transport drums, rotatably connected to heavy frames for transporting semi-continuous textile products as customary in the art) give raise to vibrations in a totally different spectrum (frequency and/or amplitude) than the surface roughness does, and therefore does not prevent the adequate use of in-line surface roughness measurement. One of the prime advantages of a method according to this embodiment is that the manufacturing process can be adapted in-line instantly, without having to await a complete lane of textile to be produced, with the risk of this lane (which can be up to hundreds of meters long) not fulfilling the predetermined surface roughness parameters. Also, in-line measurement can be non-destructive, whereas the off-line measurement apparatus as used in the art in most cases requires a small sample to be analysed, which sample has to be cut from the textile product.

In a second embodiment of the invention the measuring of the roughness of the second surface takes place after the polymer of the molten loops has cooled down to below its glass transition temperature. Applicant realized that the surface texture might still change even after solidification of the molten polymer of the yarns, namely as long as its temperature remains above the glass transition temperature of the polymer material. Therefore, it is advantageous to await the sufficient cooling down of the surface before its texture is assessed by measuring the surface roughness.

In another embodiment of the invention the measuring of the roughness takes place using a non-contact measurement method. Although a contact type of measurement might be fine to arrive at a method that meets the gist of the invention, it is found to be advantageous if the measurement method does not depend on contact between a sensor and the textile product. Especially when an in-line measurement is used, a contact type of measurement might damage the textile product and also is more sensible to environmental vibrations. With a non-contact type of measurement, for example an optical measurement method, this can be prevented, at least to a substantial extent.

In still another embodiment of the invention the second surface of the sheet is heated using a hot body that contacts the second surface. In this embodiment the melting step inherently comprises a calendering action. This decreases the window of surface roughness and therewith increases the reliability of the measurement method, this on its turn improving the manufacturing method. In a further embodiment the surface of the hot body has a relative speed (and thus moves at a relative speed greater than 0 m/s) with respect to the second surface of the first sheet. As such, the use of a hot body that has a relative speed with respect to the second surface during the melting process of the yarns is known from WO 2012/076348. It now appears that this feature leads to an increased calendering action and thus is ideally suitable for use in the present method. This combination of features may lead to a durable textile product having durable adherence properties to a second sheet. In a further embodiment the surface of the hot body is stationary, whereas the first sheet is transported along the hot body.

In an embodiment of the present method, the manufacturing process of the textile product is adapted by adapting the above described heating of the second surface and/or by performing a calendering step (which in effect might be regarded as an additional calendering step) after the at least partly molten loops of the yarns have solidified. Applicant found that the surface texture is most conveniently altered, if not meeting predetermined specifications, by adapting the heating step itself. However, the room to play with the primary heating step may not be very large, since the yarns have to meet basic binding properties (a back surface exactly meeting surface roughness demands, but having the yarns molted loose will not satisfy the properties needed for the end product). Therefore, an additional calendering step may be provided to perform a second smoothing action. Typically this additional calendering step takes place while the molten polymer still has a temperature above its glass transition temperature to ease the calendering. Regarding the adaptation of the heating step, this is advantageously adapted by changing the time period during which the second surface is heated. Although in theory also the temperature itself could be altered, such alteration can often not be obtained very fast, let alone instantly. The time period for heating can be changed very fast, for example by altering the transport speed of the product in the manufacturing line, or by mechanically altering the length of the heating process. This will be explained in more detail in the examples section.

In an embodiment wherein the textile product is a laminated textile product, i.e. a laminate of the first sheet and a second sheet, after the second surface of the first sheet has been processed according to any of the embodiments as described supra, an adhesive is applied to this second surface to which adhesive the second sheet is adhered. In a further embodiment the adhesive is a hot melt adhesive, for example a hot melt adhesive that comprises at least 50% by weight of a polymer chosen from the group consisting of polyurethane, polycarbonate, polyester, polyamide, poly(esteramide), polyolefine, mixtures thereof and/or copolymers thereof.

In a further embodiment of the laminated textile product, an intermediate layer is provided between the first sheet and the second sheet wherein the intermediate layer is resilient to allow local deformation of this layer along the second surface of the first sheet or along the surface of the second sheet adjacent to the intermediate layer. This embodiment appears to be suitable to prevent or at least mitigate a common problem of laminated textile products: internal strain in the laminate, in particular due to the influence of moist, temperature or other environmental variables. Internal strain on its turn may lead to various problems. With carpet tiles for example, internal strain may lead to the problem of curl: the edges or corners of the tiles tend to curl up. Curling of edges or corners is a problem since the edges in general to not coincide with an edge of the surface to be covered, and thus, the curled up edges or corners may lead to irregularities in center areas of the covered surface. With broadloom carpet, internal strain may lead to deformation such that interstices are formed at the joint of two sections of carpet. Also, for any laminated textile product, internal strain may lead to bulges and local excessive wear. An important reason for the occurrence of internal strain is that the laminate inherently comprises different layers (note: the term "layer" or "sheet" does not exclude that the layer or sheet is actually constituted out different sub-layers) that need to provide very different properties to the textile product (from now on also called "carpet", not excluding other types of textile products such as upholstery, clothing and wall coverings): The first sheet, also called primary backing, needs to stably bear the pile yarns. The second sheet, also called secondary backing, in general provides dimensional stability to the textile product. For this reason, the structure of the different layers is inherently different. And thus, even when for example the first and second sheet are made of the same material, the occurrence of internal strain due to different deformations by the action of moist and temperature, is inherently present. The problem is even increased when different materials are being used for constituting the sheets, in particular when these materials per se expand and contract differently due to moist and or temperature. For example, typical polymers used for making carpet are polyamide, polyester and polyalkylene. These polymers have totally different deformation characteristics due to moist and temperature. It has now been surprisingly found that this problem can be solved or at least mitigated when using a resilient layer as described here above in between the first and second sheet. Without being bound to theory, it is believed that due to the resilient properties as defined here above, it is provided that each of the sheets may expand or contract ("deform") in the horizontal direction independently of an expansion or contraction of the other sheet, and thus, that no (or only low) internal strain (which may lead to curl or other deformation) may arise. This can be understood as follows: due to the resiliency of the intermediate layer which allows local deformation of the material in this layer along the surface of at least one sheet, the horizontal deformation of (one of) the sheet(s) may now be locally absorbed by the intermediate layer, without mechanical forces being transferred directly from the first sheet to the second sheet or vice versa.

In a further embodiment the intermediate layer is a knitted layer. A knitted layer, although the fibres are in essence endless, appears to be perfectly suitable to allow only local deformation. Like a tubular knitted sock that fits every curve of a foot, a knitted layer can easily deform locally without transferring forces to neighboring areas. A knitted layer for use in the present invention is for example Caliweb®, obtainable from TWE, Emsdetten, Germany.

In a first embodiment of the device according to the invention this device comprises a central processing unit (CPU) to control the manufacturing process, wherein the sensor is operatively connected to the CPU whilst the CPU is configured to receive surface roughness data from the sensor, the CPU being programmed to adapt the manufacturing process using the said surface roughness data.

In yet another embodiment of this device, the heating element of the device comprises a hot body and means for contacting the hot body with the second surface of the sheet.

The invention will now be further explained based on the following figures and examples.

EXAMPLES

Figure 2:
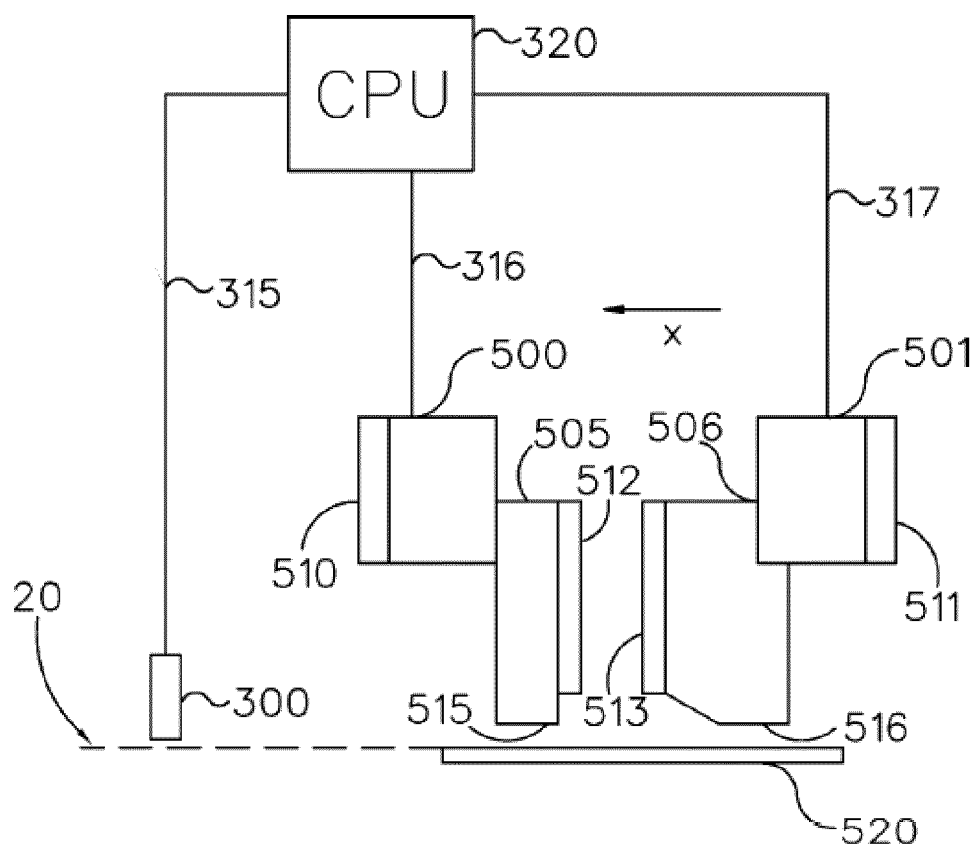
Figure 3:
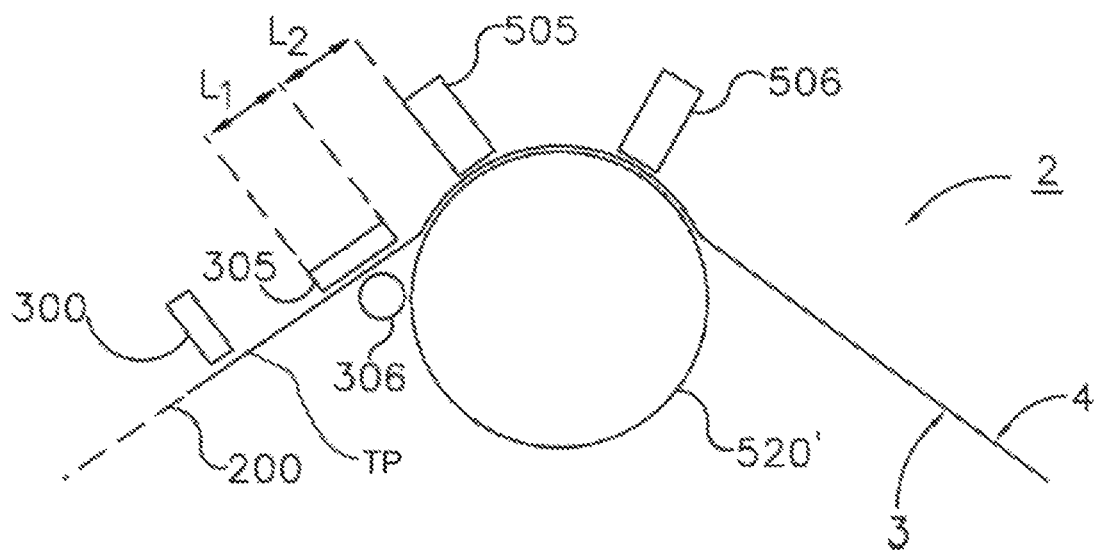
Figure 4:
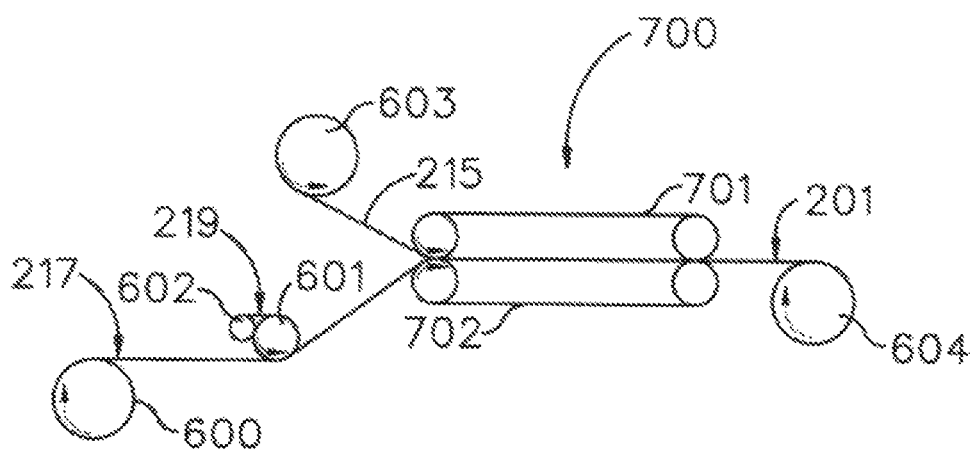

FIG. 1 schematically shows a cross section of a textile product manufactured according to the invention FIG. 2 schematically shows details of a textile manufacturing process according to the invention FIG. 3 schematically shows an overview of a textile manufacturing process according to the invention FIG. 4 schematically represents a laminating configuration Example 1 describes an example of measuring surface roughness

FIG. 1

FIG. 1 is a schematic representation of respective layers of an embodiment of a laminated textile product manufactured according to the invention, in this case a carpet tile. The tile comprises a first sheet 2, the so called primary backing, which may be a tufted nonwoven sealed polyester backing. The polyester yarns 5 extend from the first surface 3 of this first sheet and are sealed to the second surface 4 of the sheet using the yarn melting method as described with reference to FIG. 2. The weight of this first sheet is typically about 500-800 g per m². In order to provide mechanical stability, the tile 1 comprises a second sheet 6, in this case a polyester needle felt backing. The weight of this second sheet is typically about 700-900 g/m². In between the first and second sheet is an optional resilient layer 10 (which could for example be a polyester expansion fleece having a weight of 330 g/m², obtainable from TWE, Emsdetten, Germany as Abstandsvliesstof). The three layers (first and second sheet and intermediate layer) are laminated together using a glue, which may be a polyester hot melt glue as obtainable from DSM, Geleen, the Netherlands, applied as layers 11 and 12 at a weight of about 300 g/m².

FIG. 2

FIG. 2 which schematically shows details of a textile manufacturing process according to the invention. In the configuration shown in FIG. 2 a first heating block 500 and a second heating block 501 are present, in order to heat the heating elements, also denoted as heating blades or heating bodies, 505 and 506 respectively. These heating elements have a working surface 515 and 516 respectively, which surfaces are brought in contact with a product to be processed, typically a primary carrier to which yarns are applied via a stitching process such as tufting. The working surfaces both have a working width of 18 mm, and the intermediate distance is 26 mm. The back surface of the product (i.e. the second surface of the first sheet as explained with reference to FIG. 1) is brought in contact with the working surfaces of the heating elements. In order to be able and apply adequate pressure for the product to be processed, a Teflon support 520 is present which is used to counteract a pushing force applied to the heating elements. In operation, the heating elements are stationary and the product 2 (not indicated in dashed lines in FIG. 2) is moved relatively to the heating elements in the indicated direction X to become product 20 (indicated in dashed lines).

The (intermediate) textile product to be processed with the above described configuration consists of a primary sheet provided with a cut pile of polyester yarns, tufted into the sheet. The yarns typically have a melting temperature of about 260-280° C. This product is processed using a temperature of the heating element 506 of 200-220° C. in order to pre-heat the product. The other (distal) heating element 505 is kept at a temperature about 15° C. above the melting temperature of the polyester yarns. To keep the temperatures at the required level, the heating blocks and heating elements are provided with layers of insulating material 510, 511, 512 and 513 respectively. The product is supplied at a speed of 12 mm per second (0.72 metre per minute) or higher, and the pressure applied with the heating elements is about 1.35 Newton per square centimetre. This way, the loops of the yarns at the second surface of the sheet are partly molten and mechanically spread over the second surface to form a semi-continues layer of molten material that locks the yarns into the first sheet. Depending i.a. on the temperature of the heating elements, the pressure applied and the process speed, this will result in a second surface having a more or less smoothed surface with some noticeable surface texture.

Downstream (distal) of the heating blocks, at a section where the molten material will be sufficiently solidified, directed to the second surface of the product 20, is an optical surface roughness measurement sensor 300. With this sensor the 2D surface roughness of the second surface can be measured and data corresponding to this surface roughness are sent to CPU 320 via line 315. In this CPU, the actual surface roughness data are compared to predetermined values. If the data match these values, no adaptation of the manufacturing process will follow. If however the data indicate that the roughness is either too small (surface too smooth) or too large (surface too rough), the time period of heating and/or the heating temperatures of the two heating blocks 500, 501 may be adapted via lines 316, 317 from CPU 320, respectively, in order for a next section of product to meet the predetermined surface roughness data. Also, the pressure with which plate 520 is pressed against the heating blocks may be adapted.

FIG. 3

FIG. 3 schematically shows an overview of a textile manufacturing process according to the invention. In this embodiment, the heating bodies 505 and 506 are arranged around a circular support 520'. The first sheet 2 is transported with its second surface 4 towards the heating bodies, while the first sheet 2 is lying with its first surface 3 (actually the pile that extends from the first surface 3) on the rotating support drum 520'. At the downstream side of the drum 520', the first sheet 2 is transported along transport path 200 and encounters cooling beam 305. In this embodiment, the cooling beam 305 is a Teflon® coated aluminum stationary massive beam having a thickness of 20 mm, kept at a temperature below the glass transition temperature of the polyester yarns, typically below 120° C. The beam 305 has a length $L_1$ of 80 mm in the transport direction, and is situated at a distance $L_2$ of 76 mm from heating body 505. Depending on the process speed, the beam 305 is actively cooled to prevent that its temperature rises too much. At process speeds below 1-2 meters/minute active cooling of the beam is generally not required. Above a process speed of 3 m/min, active cooling is usually required. The beam 305 is pressed against the second surface 4 of the first sheet 2, using rotating counter roller 306, to provide for an additional calendering action to thereby form the intermediate textile product TP. A surface roughness sensor 300 is positioned at a distal section directed toward the second surface 4 of the first sheet 2. In this embodiment, both the heating elements and the beam/roller combination for the additional calendering step, are controlled by a CPU (not shown), at least partly based on surface roughness data received by the CPU from sensor 300.

FIG. 4

FIG. 4 schematically represents a laminating configuration for applying a second sheet, in this case a dimensionally stable secondary backing sheet, to the back of the first sheet that is produced with a method as described in conjunction with FIG. 2. In this embodiment the term 'target sheet' denotes either the separate resilient layer and second sheet applied one after the other in that order, or the combined laminate of them both applied together to the first sheet. Both the second sheet and the resilient layer may be of polyester. In this figure a first roller 600 is depicted on to which roller is wound a 2 metre wide web of the said (pre-fabricated) product made according to the method described in conjunction with FIG. 2. The product is unwound from the roller 600 to have its back-side 217 to come into contact with a second roller 601. This roller is provided to apply a layer of hot melt adhesive (HMA) 219 to the back side 217. For this, a bulk amount of HMA 219 is present and heated between the rollers 601 and 602. The thickness of this layer can be adjusted by adjusting the gap between these two rollers. Downstream of the section where the HMA is applied is the target sheet 215, which sheet is unwound from roller 603. This sheet is pressed against the hot and tacky adhesive and cooled in the unit 700. This unit consists of two belts 701 and 702 which on the one hand press the target sheet 215 against the primary product, i.e. the product that comprises the product of FIG. 2 with a layer of HMA 219 applied to it, and on the other hand cools down the adhesive to below its solidification temperature. The resulting end product 201 (corresponding to textile product 1 of FIG. 1) is thereafter wound on roller 604. In an alternative embodiment the fibre-binding process as described in relation with FIG. 2 and the lamination process take place in line. In that case, the fibre-binding set-up as shown in FIG. 2 could be placed between roller 600 and roller 601. In this embodiment the applied HMA is the polyester of Example D as described in the Research Disclosure RD591084 as mentioned herein before. A suitable temperature of the roller 601 at the site where this HMA is applied to the back-side of the primary backing is 140° C. By having a gap of 2 mm, the HMA, at a web speed of 2 m/min, roller 602 not revolving and roller 601 having a circumferential speed of ±1.6 m/min, will be applied with a thickness of about 500 g/m². This is adequate to glue the target sheet 215 to the primary backing (i.e. the first sheet).

The hot melt adhesive may be optionally provided as a layer having a thickness of less than 1 mm, usefully less than 0.5 mm, more usefully from 0.2 to 0.4 mm. Whereas in the prior art carpets on the market, the hot melt layer typically has a thickness well above 1 mm, applicant found that when reducing the thickness of this layer to 1 mm or below an adequate adhesion can still be obtained. Therefore, the adhesive layer present in textile products of the present invention may have preferred mean thickness of from 50 microns to 1 mm, more preferably from 0.1 mm to 0.8 mm, most preferably from 0.2 mm to 0.4 mm. The amount of HMA used to form the adhesive layer in textile products of the present invention may be from 0.01 to 1000 g/m² of HMA per area of the adhesive layer. In another embodiment the HMA may be applied in an amount of from 0.05 to 800 g/m². In a still yet other embodiment HMA may be applied in an amount from 0.1 to 600 g/m².

EXAMPLE 1

In this example a method of measuring surface roughness is described. Three textile products were made using the method as described in the GENERAL FIELD OF THE INVENTION section, i.e. a method wherein polymer yarns are stitched through a sheet to form the pile on a surface of this sheet and loops of the yarns at the back surface of this sheet, whereafter the sheet is heat treated to at least partly melt the loops of the yarns (cf. the method as outlined with respect to FIG. 3). For this test, the three products each underwent a different heating process, i.e. the melting and spreading process was done differently to arrive at three products with different durability properties, ranging from "good", to "middle" and "bad". It was established whether this difference in properties could be captured in or more surface roughness indicators. For this, the surface roughness of each of the products (after cooling down to below the melting temperature of the yarns) was measured using a MikroCad premium surface roughness measurement device (available from LMI Technologies, Delta, Canada). This device has a measuring area of 60×80 mm², and is able to assess the surface roughness at a high throughput speed (8 meters/minute or above). An alternative device is the Gocator laser scanner (also available from LMI Technologies), but this device was not used in this experiment.

The MikroCad device can generate multiple different types of surface roughness indicators. Here below in Table 1, the results for the following indicators are given:

$S_{pk}$: this value summarizes the highest peak variations. If the yarns are very well melted and the molten material is well spread, one would expect this value to be low.

$S_k$: this is a value which represents the roughness of the bulk of the material.

$S_{vk}$: this value represents the peaks in the valleys.

TABLE 1

Surface roughness indicators for three qualities, with standard deviations

| Quality | $S_{pk}$ ± STD | $S_k$ ± STD | $S_{vk}$ ± STD |
|---------|----------------|-------------|----------------|
| Good    | 51 ± 10        | 369 ± 13    | 138 ± 9        |
| Middle  | 65 ± 8         | 452 ± 19    | 149 ± 11       |
| Bad     | 112 ± 36       | 380 ± 42    | 193 ± 18       |

From the results it appears that for this property, the $S_pk$ and $S_{vk}$ indicators correspond well to the quality of the product. Also, the standard deviations are relatively small. This means that one of these parameters might be used to establish a predetermined surface roughness (corresponding for example to an allowed range for one of these indicators). During manufacturing, if it would be established that the roughness differs from this predetermined surface roughness, the method may be adapted in order to obtain a surface roughness that meets the predetermined surface roughness.

The invention claimed is:

1. A method to manufacture a textile product comprising a first sheet having polymer yarns fastened to the first sheet to form a pile thereon, wherein the method comprises the steps of:
    (a) providing the first sheet,
    (b) stitching the polymer yarns through the first sheet to form the pile on a first surface of the first sheet and loops of the yarns at a second surface of the first sheet,
    (c) heating the second surface of the first sheet to at least partly melt the loops of the yarns to fasten the yarns to the first sheet,
    (d) allowing the at least partly melted loops of yarns to solidify;
    (e) measuring a roughness of the second surface with the solidified at least partly melted loops of the yarns thereon, and and
    (f) determining if the measured roughness of the second surface differs from a predetermined surface roughness and responsively adapting the method to manufacture the textile product in order to obtain a second surface roughness that differs from the measured surface roughness.

2. The method according to claim 1, wherein steps (e) and (f) are practiced in line.

3. The method according to claim 1, wherein step (e) is practiced after the at least partly melted loops of the polymer yarns has cooled to below a glass transition temperature of the polymer yarns.

4. The method according to claim 1, wherein step (e) is practiced using a non-contact measurement method.

5. The method according to claim 1, wherein step (e) is practiced using an optical measurement method.

6. The method according to claim 1, wherein step (c) is practiced by heating the second surface of the first sheet using a hot body that contacts the second surface of the first sheet.

7. The method according to claim 6, wherein the hot body has a relative speed with respect to the second surface of the first sheet.

8. The method according to claim 1, wherein step (f) comprises adapting the heating of the second surface according to step (c) and/or performing a calendering step after the at least partly melted loops of the polymer yarns have been solidified according to step (d).

9. The method according to claim 8, wherein step (f) comprises adapting the heating of the second surface by changing a time period during which the second surface is heated.

10. The method according to claim 1, wherein the textile product is a laminate of the first sheet and a second sheet, and wherein the process further comprises the steps of:
    (g) applying an adhesive to the second surface of the first sheet, and
    (h) adhering the second sheet to the second surface of the first sheet by the applied adhesive.

11. The method according to claim 10, wherein the adhesive is a hot melt adhesive.

* * * * *